United States Patent
Cannon et al.

(10) Patent No.: US 6,925,314 B2
(45) Date of Patent: Aug. 2, 2005

(54) ADJUSTMENT OF PERIOD OF REAL-TIME SLOW DRIFT CORRECTION OF ALIGNMENT OF HANDSET'S LOCAL OSCILLATOR FOR A CORDLESS TELEPHONE

(75) Inventors: Joseph M. Cannon, Harleysville, PA (US); Philip D. Mooney, North Wales, PA (US)

(73) Assignee: Agere Systems Inc., Allentown, PA (US)

( * ) Notice: Subject to any disclaimer, the term of this patent is extended or adjusted under 35 U.S.C. 154(b) by 27 days.

(21) Appl. No.: 10/752,704

(22) Filed: Jan. 8, 2004

(65) Prior Publication Data

US 2004/0137962 A1 Jul. 15, 2004

Related U.S. Application Data

(62) Division of application No. 09/447,279, filed on Nov. 23, 1999, now Pat. No. 6,678,537.

(51) Int. Cl.[7] .............................. H04B 1/38; H04Q 7/20
(52) U.S. Cl. ..................... 455/574; 455/67.11; 455/462
(58) Field of Search ................................. 455/573, 572, 455/517, 574, 127, 343.1; 320/114, 115, 136, 134, 149; 702/60–65

(56) References Cited

U.S. PATENT DOCUMENTS

| | | | |
|---|---|---|---|
| 4,656,653 A | * | 4/1987 | Oda et al. .................... 455/573 |
| 4,910,761 A | * | 3/1990 | Shimura et al. ............. 455/573 |
| 4,979,205 A | | 12/1990 | Haraguchi et al. |
| 4,992,720 A | | 2/1991 | Hata |
| 5,142,563 A | * | 8/1992 | Nyuu et al. .................. 455/573 |
| 5,297,203 A | | 3/1994 | Rose et al. |
| 5,392,287 A | | 2/1995 | Tiedemann, Jr. et al. |
| 5,509,015 A | | 4/1996 | Tiedemann, Jr. et al. |
| 5,528,667 A | * | 6/1996 | Steffensen et al. ........... 455/462 |
| 5,677,944 A | | 10/1997 | Yamamoto et al. |
| 5,686,813 A | | 11/1997 | Huen et al. |
| 5,794,146 A | | 8/1998 | Sevcik et al. |
| 5,870,685 A | * | 2/1999 | Flynn .......................... 455/573 |
| 6,011,788 A | | 1/2000 | Hurst et al. |
| 6,041,241 A | | 3/2000 | Willey |
| 6,330,234 B1 | | 12/2001 | Tomasi et al. |
| 6,445,936 B1 | * | 9/2002 | Cannon et al. .............. 455/573 |
| 6,678,537 B1 | * | 1/2004 | Cannon et al. .............. 455/574 |
| 6,710,578 B1 | * | 3/2004 | Sklovsky ..................... 320/127 |
| 2002/0128051 A1 | * | 9/2002 | Liebenow .................... 455/574 |

* cited by examiner

Primary Examiner—Charles N. Appiah

(57) ABSTRACT

A method and apparatus to perform a real-time drift correction of a remote handset's local oscillator in a digital cordless telephone. The remote handset begins in a standby (sniff) mode. The remote handset periodically wakes from a sleep mode and goes into a normal link verification mode. Once in the link verification mode, the remote handset enters a time division duplexing (TDD) mode and attempts to establish a link with a base unit based on the timing of the TDD data frame. After the remote handset establishes a link with the base unit, the remote handset requests a security word from the base unit. Upon receiving the requested security word, the remote handset determines if the requested security word matches a security word of the remote handset. The remote handset implements a software frequency adjustment of its local oscillator. Once per frame, the remote handset enters a timing recovery state where the current state of the frame is compared with a previous state. When the cumulative timing slip is greater than a designated threshold, a frequency adjustment is made. During this exchange of commands between the remote handset and base unit, the remote handset continuously adjusts its local oscillator to achieve frequency alignment within, e.g., 1 part per million (ppm). Alternatively, frequency alignment may be achieved to a specified value. The period of the frequency alignment can be lengthened (or even suspended) during certain power critical modes to reduce power consumption. For example, the period of the link verify operations (and thus the frequency alignment) can be lengthened or suspended when the remote handset is being quick charged. Moreover, the period of the link verify operations can be adjusted based on a voltage level of the battery in the remote handset.

16 Claims, 15 Drawing Sheets

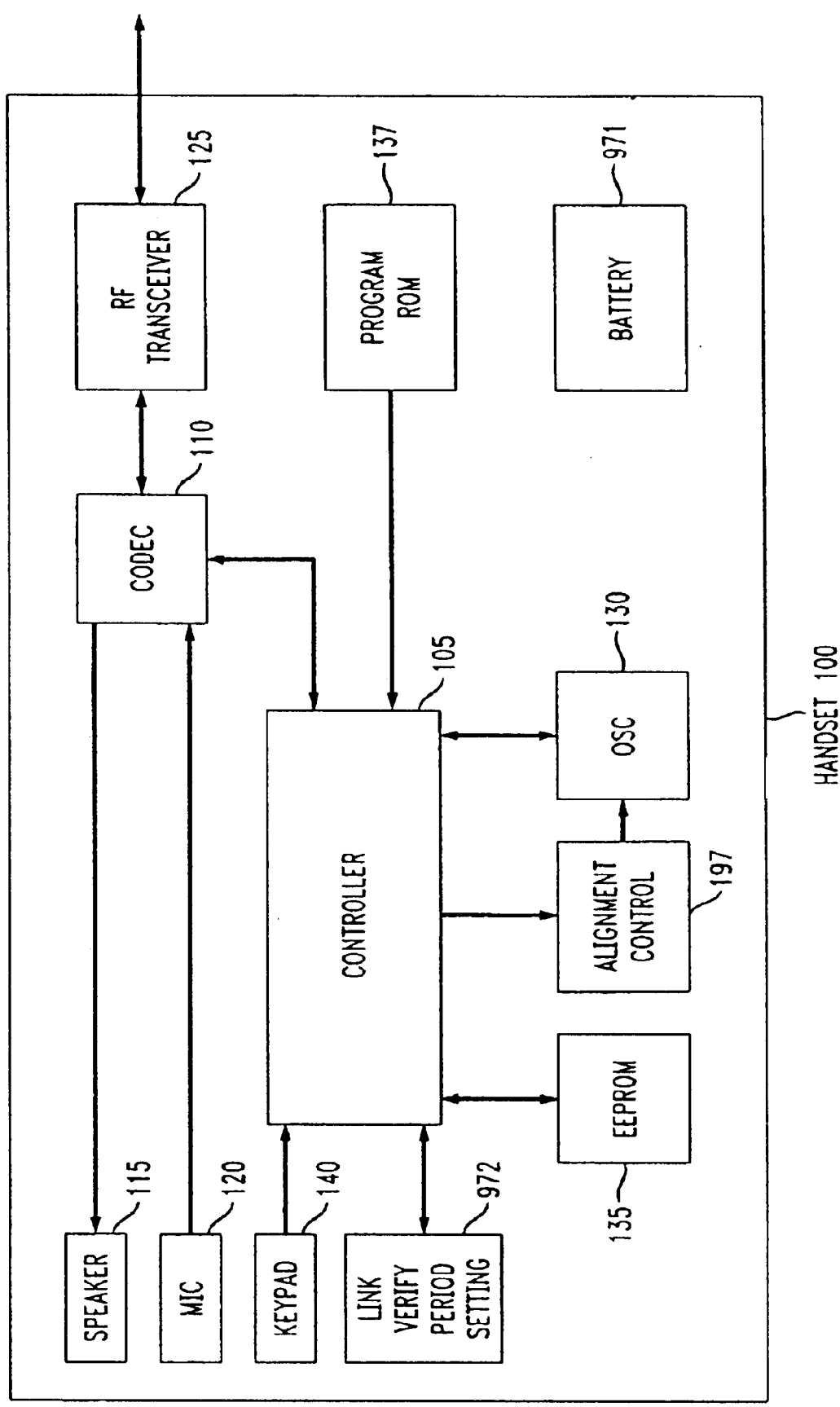

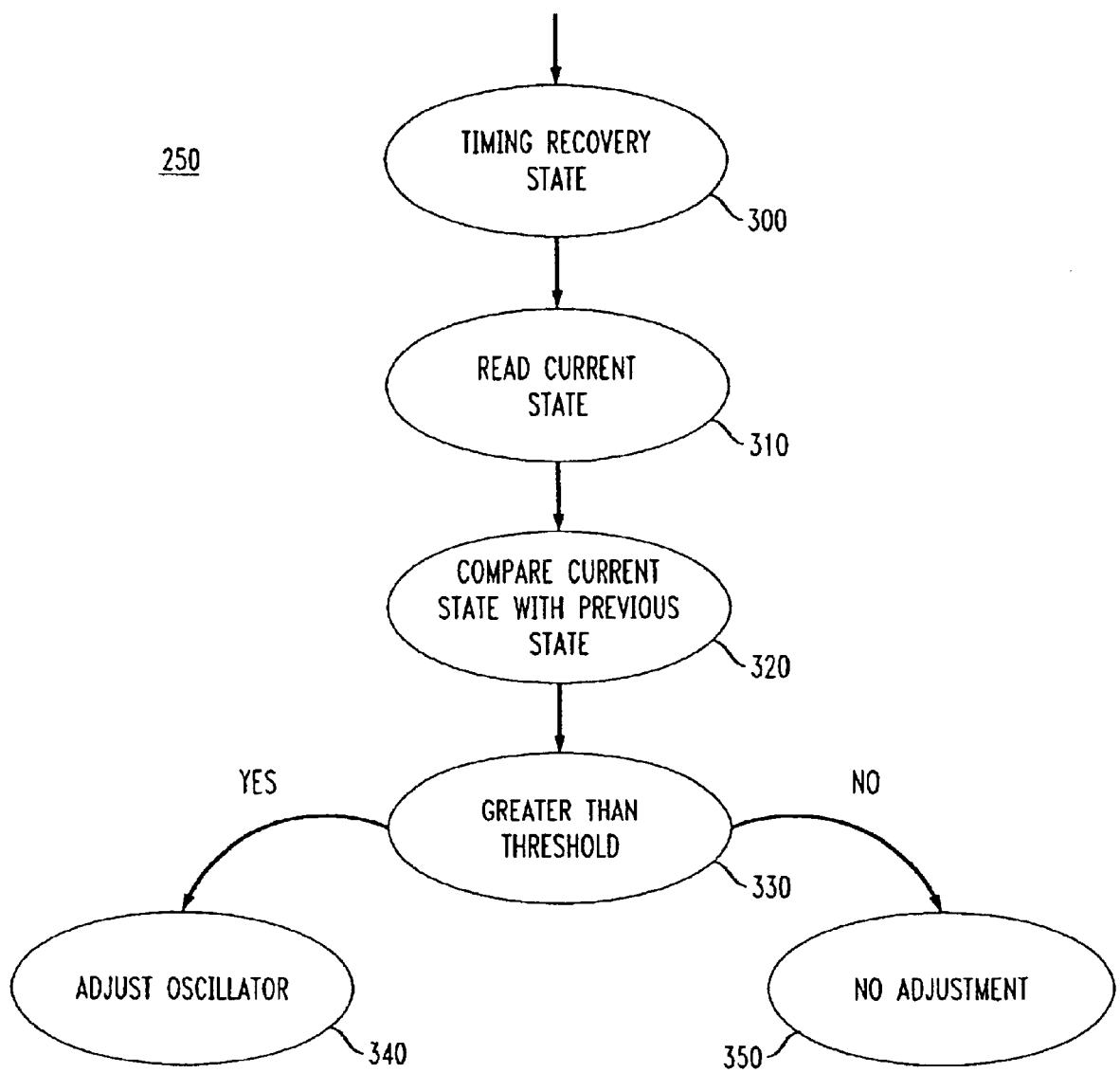

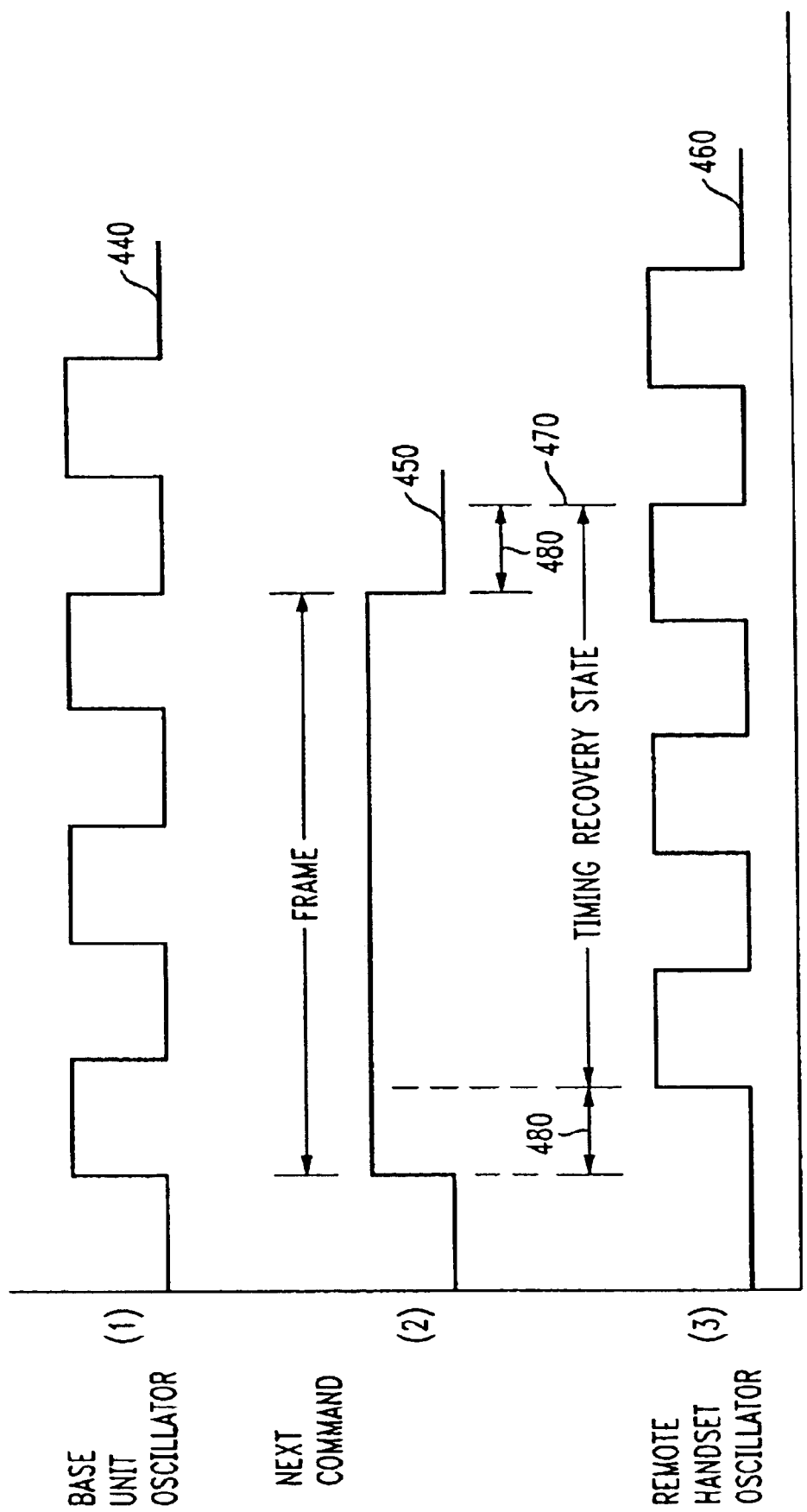

ADJUSTMENT OF PERIOD OF REAL-TIME SLOW DRIFT CORRECTION OF ALIGNMENT OF HANDSET'S LOCAL OSCILLATOR FOR A CORDLESS TELEPHONE

This application is a Divisional application of U.S. application Ser. No. 09/447,279, entitled "Adjustment of Period Real-Time Slow Drift Correction of Alignment of Handset's Local Oscillator for a Cordless Telephone", filed Nov. 23, 1999 now U.S. Pat. No. 6,678,537, issued on Jan. 13, 2004, the entirety of which is expressly incorporated herein by reference.

BACKGROUND OF THE INVENTION

1. Field of the Invention

This invention relates generally to cordless telephones. In particular, this invention relates to correction of a local oscillator of a remote handset in a cordless telephone.

2. Background of Related Art

Cordless telephones have gained in popularity over the years, and can now be found in many if not most homes or businesses. A cordless telephone is one in which the handset is not wired to its base unit, but instead uses wireless communication techniques between a remote handset and its base unit, typically allowing the remote handset to be used up to 1000 feet or more away from its base unit.

FIG. 11A illustrates a typical remote handset 800 of a digital cordless telephone.

The remote handset 800 includes a controller 805, a coder-decoder (CODEC) 810, a speaker 815, a microphone 820, a radio frequency (RF) transceiver 825, a local oscillator 830, an EEPROM 835, a keypad 840, a timing recovery circuit 845 and a program ROM 837.

In the transmit direction, the microphone 820 outputs an analog signal to the CODEC 810, which converts the microphone input signal to a digital microphone signal. As part of the conversion process, a clock signal is provided from the local oscillator 830 for the CODEC 810 to sample the microphone signal. The digital microphone signal is then passed to the RF transceiver 825 for encoding into a radio frequency (RF) signal for transmission to a complementary base unit. The controller 805 also retrieves frequency control information from the EEPROM 835 to select the frequency that the RF transceiver 825 transmits. The program ROM 837 also provides a storage medium for the software that operates the remote handset 100 and for a security word.

In the receive direction, the RF transceiver 825 receives a RF signal from the complementary base unit. The RF transceiver 825 converts the RF signal to a digital signal that is passed to the CODEC 810 for decoding. The timing recovery circuit 845 provides correction information to the controller 805 to adjust the local oscillator 830 for the decoding of the digital signal. The output of the CODEC 810 is an analog signal for output by the speaker 815.

FIG. 11B illustrates a base unit 850 of the digital cordless telephone. The base unit 850 contains circuitry which is complementary to that contained in the remote digital handset 800, i.e., a complementary RF transceiver 870, a controller 855, a CODEC 860, an EEPROM 880, a program ROM 882, a timing recovery circuit 885 and a local oscillator 875. The base unit 850 also includes a telephone line interface 865 to interface with a public switched telephone network and a ring detect circuit 890 to detect the ring signal corresponding to an incoming telephone call.

For optimum performance between the remote handset 800 and the base unit 850, both local oscillators, 830 and 875, typically need to be frequency aligned. Preferably, the handset's local oscillator 830 typically needs to be frequency aligned with the base unit's local oscillator 875 to within 1 part per million (ppm) for reliable and noise-free communication.

A local oscillator may drift for a variety of reasons. A temperature change, a voltage change, or a tolerance variation in the components used in the digital cordless telephone may contribute to local oscillator drift.

There are several ways to correct for local oscillator drift. One method is called a coarse frequency search. A remote handset of a cordless telephone in the coarse frequency search will adjust the remote handset's oscillator to within a range of 5 ppm from as far off as 300 ppm. The coarse frequency search may be performed at any time, but its purpose is to achieve frequency alignment to within about 5 ppm at best. A coarse frequency search is very time-consuming, e.g., 1–2 sec., and will drain the remote handset's battery if done while the cordless telephone is out of cradle.

Another method to correct for local oscillator drift is to use a synchronization bit(s) or frame. In a typical cordless telephone, a remote handset and a base unit communicate over the RF link using packets or frames. As part of the frame, several bits are reserved as synchronization bits. FIG. 12 illustrates a typical frame 900 used in communication between a remote handset and a base unit including a synchronization field.

As shown in FIG. 12, the frame 900 includes a data field 910, error correction code ("ECC") field 920 and a synchronization field 920. Each respective field includes a number of bits. The number of bits per field is dependent on the functionality of the field.

The data field 910 of the frame 900 typically contains the encoded voice signals.

The ECC field 920 of the frame 900 typically contains the error correction code for the data field 910. As the voice signals are encoded, typically, an error correction code is included in the frame 900 to ensure that the voice signals are properly transmitted and received.

The synchronization field 930 provides a method for a remote handset and base unit to frequency align by using the synchronization field to correct the receiving local oscillator or to derive a clock signal.

Although this method is effective, the synchronization field technique requires time for the receiving remote handset or base unit to frequency align. Moreover, this synchronization time may introduce unwanted delays in the communications between the base unit and the remote handset.

There is a need for an improved method and/or apparatus to frequency align a remote handset's local oscillator with a base unit's local oscillator to a high degree, e.g., to within 1 ppm for reliable and noise free communication.

SUMMARY OF THE INVENTION

In accordance with the principles of the present invention, a link verification controller for a wireless device comprises a default link verify period setting to establish a first period for a link verification operation between a remote device and a matching base unit during normal operations. A controller adjusts the established first period for the link verification based on a status of a battery of the remote device.

A method of determining a period for an operation between a remote unit and a matching base unit in accordance with another aspect of the present invention comprises detecting a charging to a remote handset from a base unit. A period is adjusted between a check of frequency alignment between the remote handset and the base unit based on a battery voltage level in the remote handset.

BRIEF DESCRIPTION OF THE DRAWINGS

Features and advantages of the present invention will become apparent to those skilled in the art from the following description with reference to the drawings, in which:

FIG. 1A illustrates a block diagram of a remote handset of a digital cordless telephone implementing a real-time drift correction of a local oscillator.

FIG. 3 illustrates an exemplary flow diagram of the frequency alignment phase of the real-time drift correction of a local oscillator in FIG. 2.

FIG. 4B illustrates a timing diagram of a timing recovery state for a drifted remote handset oscillator.

DETAILED DESCRIPTION OF ILLUSTRATIVE EMBODIMENTS

Figure 1B:
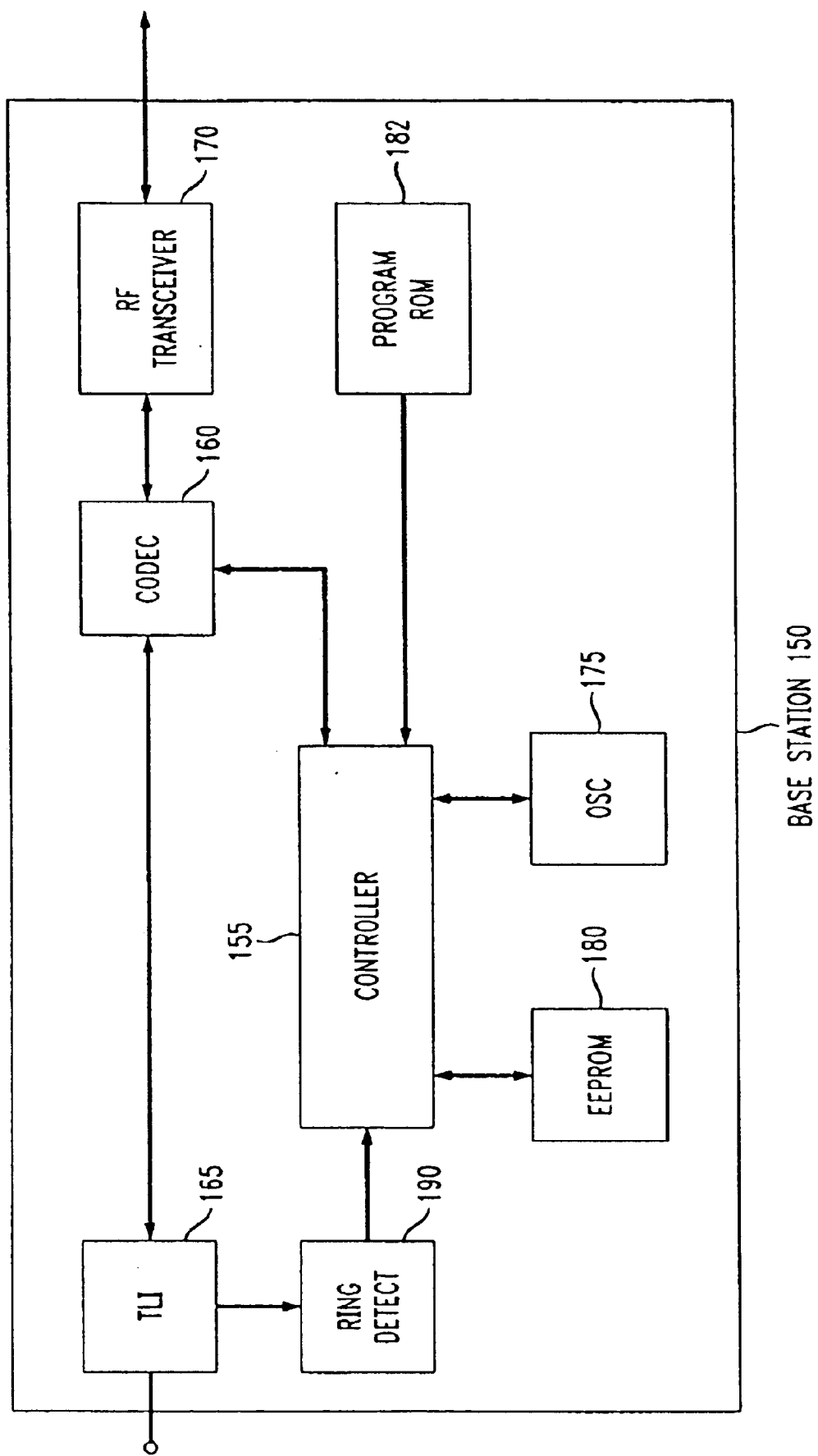
FIG. 1B illustrates a block diagram of a base unit of a digital cordless telephone implementing a real-time drift correction of a local oscillator of the remote handset of FIG. 1A.

The present invention frequency aligns a local oscillator of a remote handset with a local oscillator of a base unit in a digital cordless telephone.

In particular, the present invention provides for a periodic fine adjustment at regular intervals of a remote handset's local oscillator while the remote handset is in its standby (sniff) mode. Advantageously, the frequency alignment operation can take less than 400 ms every minute, and thus will not interfere with the normal operations of the digital cordless telephone, while continuously maintaining frequency alignment.

Alternatively, link verification may be done less frequently based on oscillator drift characteristics under assumed temperature and voltage conditions. A longer link verification duration, e.g., 15 minutes, may exist and allow for greater times between scheduled verifications, particularly in lower power applications.

The real-time drift correction of a remote handset's local oscillator, in accordance with the principles of the present invention, begins with the remote handset in a standby (sleep sniff) mode. The remote handset periodically awakens from a sleep mode, e.g., every fifteen minutes (or some other predetermined interval) and goes into a normal link verification mode.

Once in the link verification mode, the remote handset enters a time division duplexing (TDD) mode and attempts to establish a link with the base unit.

After the remote handset establishes a link with the base unit, the remote handset requests a security word from the base unit. Upon receiving the requested security word, the remote handset determines if the requested security word matches the security word of the remote handset. During this exchange of commands between the remote handset and the base unit, the remote handset continuously adjusts its local oscillator to achieve frequency alignment within, e.g., 1 part per million (ppm) to the frequency of the local oscillator of the base unit. Alternatively, frequency alignment may be achieved within a user-specified ppm value.

The remote handset achieves frequency alignment during the command exchange by implementing a software frequency adjustment of its local oscillator in a controller of the remote handset. Since a command occupies a frame, the controller of the remote handset enters a timing recovery state once during the frame where the current timing of the frame is compared with a previous timing. When a cumulative timing slip is greater than a designated threshold, a frequency adjustment is made. Thus, frequency alignment is achieved in a rapid fashion.

FIG. 1A is an illustration of an embodiment of a remote handset 100 of a digital cordless telephone implementing a real-time slow drift correction of a local oscillator.

In particular, FIG. 1A shows a block diagram of a remote handset 100 implementing a real time slow drift correction of a local oscillator. The remote handset 100 includes a controller 105, a coder-decoder (CODEC) 110, a speaker 115, a microphone 120, a radio-frequency (RF) transceiver 125, a local oscillator 130, an EEPROM 135, a program ROM 137, a keypad 140, an alignment control 197, a battery 971, and a link verify period setting 972, The controller 105 may be a digital signal processor (DSP), microprocessor, microcontroller, or combinational logic. The controller 105 provides an execution platform to execute a suitable software program to operate the remote handset 100.

The CODEC 110 provides a way to convert between analog voice signals and digital voice signals. The CODEC 110 is an electronic device that converts analog voice signals to digital voice signals via an analog-to-digital converter. Also, the CODEC 110 converts received digital voice signals to analog voice signals via a digital-to-analog converter.

The CODEC 110 converts between the analog and digital signals based on a clock signal provided by the local oscillator 130. The local oscillator 130 may be a voltage-controlled oscillator ("VCO") where a control voltage may alter the output frequency of the local oscillator 130 by the alignment control 197 under the control of the controller 105.

The microphone 120 provides a way for the user to input voice signals into the remote handset 100.

The speaker 115 provides a way for the user to hear the output voice signals from the remote handset 100.

The RF transceiver 125 provides an RF interface between the remote handset 100 and a complementary base unit. The remote handset 100 relays voice signals between a base unit via an RF link. The RF transceiver 125 provides a conversion between RF signals and the digitized voice signals.

The program ROM 137 provides a storage medium to store software that operates the remote handset 100. The EEPROM 135 stores frequency control information such as a digital-to-analog converted (DAC) value of the frequency, and a security word. The DAC value is used to control the frequency of the local oscillator 130 of the remote handset. The security word is used during exchanges between an exclusively matched set of, e.g., a remote handset and its base unit.

The keypad 140 provides a way for the user to operate the digital cordless telephone.

The battery 971 provides power to the remote handset 100.

The link verify period setting timer 972 provides a way to program how often the remote handset 100 corrects the drift of its local oscillator 130.

In the transmit direction, the microphone 120 outputs an analog signal to the CODEC 110, which converts the microphone input signal to a digital microphone signal. The digital microphone signal is input to the RF transceiver 125 for encoding into a digital signal for transmission to a complementary base unit. The controller 105 directs the output from the local oscillator 130 to encode the digital microphone signal. The controller 105 also retrieves frequency control information from the EEPROM 135 to select the frequency that the RF transceiver 125 transmits.

In the receive direction, an RF transceiver 125 receives an RF signal from the complementary base unit. The RF transceiver 125 converts the received signal to a digital signal that is then passed to the CODEC 110 for decoding. The local oscillator 130 provides a clock signal via the controller 105 to the CODEC 110. The output of the CODEC 110 is an analog voice signal for output by the speaker 115.

FIG. 1B illustrates a base unit 150 of the digital cordless telephone. The base unit 150 contains circuitry which is complementary to that contained in the remote handset 100, i.e., a complementary RF transceiver 170, a controller 155, a CODEC 160, an EEPROM 180, a program ROM 182 and a local oscillator 175. The base unit 150 also includes a telephone line interface 165 to interface with a public switched telephone network. A ring detect circuit 190 detects the ring voltage relating to an incoming telephone call.

Figure 2:
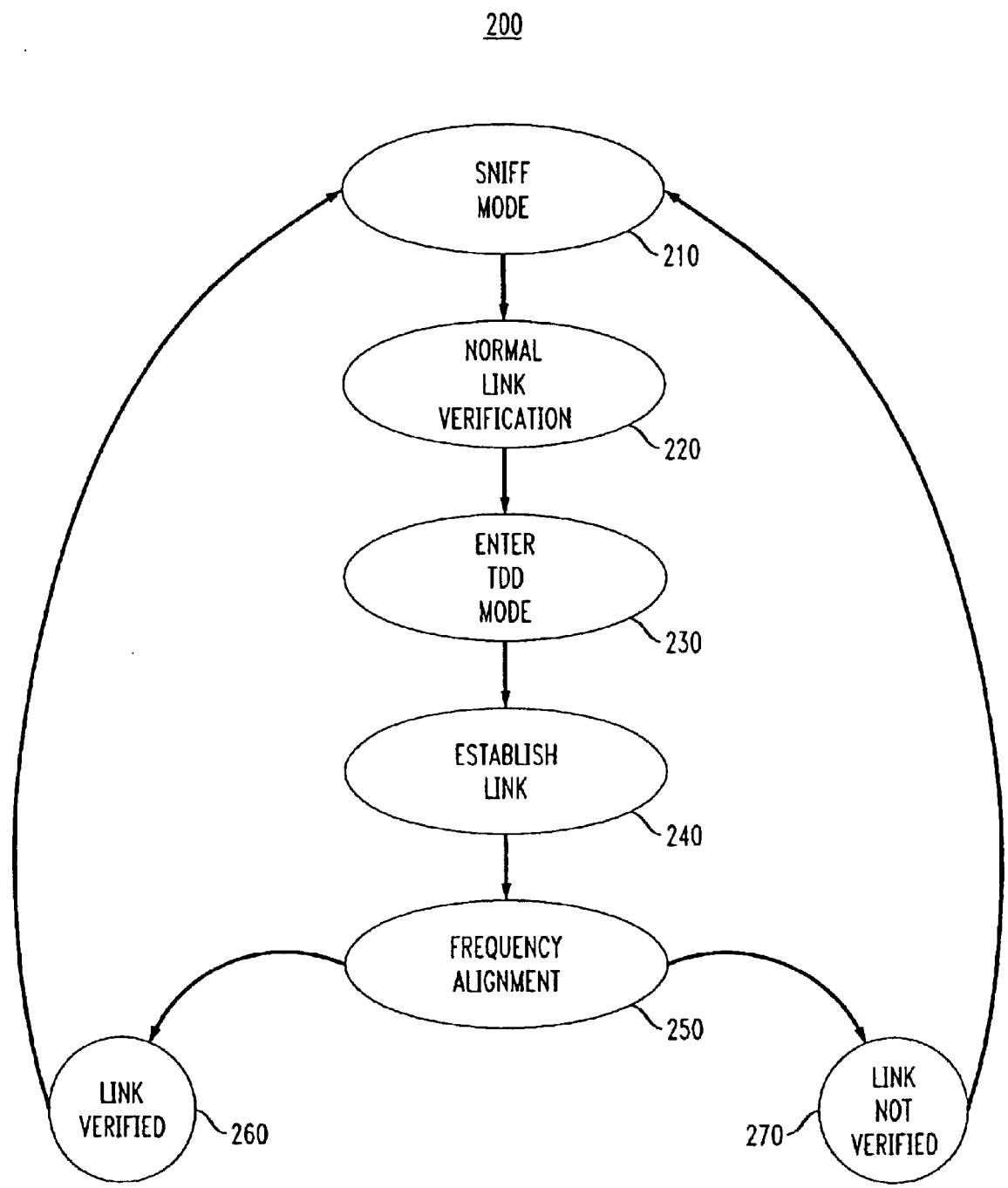
FIG. 2 illustrates an exemplary high-level flow diagram of a real-time drift correction of a local oscillator for a remote handset.

FIG. 2 shows an embodiment of a real-time slow drift correction of a local oscillator 130 used in the remote handset 100 of the digital cordless telephone such as that shown in FIG. 1A.

In particular, FIG. 2A shows an example of a software state module 200 affected by the real-time slow drift correction of the local oscillator 130 implemented by the controller 105 of the remote handset 100 shown in FIG. 1A.

In step 210, the controller 105 places the remote handset 100 in a sniff mode. The sniff mode is a standby mode of operation for the remote handset 100. While in the sniff mode, the remote handset 100 is able to conserve power while monitoring the RF link for incoming transmissions from the base unit 150.

Periodically, the controller 105 of the remote handset 100 disengages from a sleep sniff or standby mode that conserves battery life to begin a normal link verification, as shown in step 220. The controller 105 may initiate the normal link verification at a pre-determined interval such as every one-minute or other pre-defined interval.

Once in the normal link verification, the remote handset 100 enters into a time domain duplex (TDD) mode, as shown in step 230.

Once in the TDD mode 230, the remote handset 100 attempts to establish an RF link with the base unit 150, as shown in step 240. The local oscillator 130 of the remote handset 100 is controlled by a DAC value written by the controller 105. The controller 105 retrieves the last used DAC value relating to the frequency timing from the EEPROM 135, and subsequently initiates a link verification. The last used DAC value is stored in the EEPROM 135 prior to entering the sniff mode or exiting TDD mode.

Step 250 shows the frequency alignment phase. After the RF link is established, the remote handset 100 requests a unique security word from the base unit 150. After the unique security word is received by the remote handset 100, the controller 105 determines if the received security word matches the remote handset security word. During this exchange of commands, the controller 105 of the remote handset 100 continuously adjusts its local oscillator 130 to achieve frequency alignment within 1 ppm (or some pre-defined ppm).

If, from step 250, the requested security word matches, the RF link is verified as shown in step 260. In this case, the controller 105 of the remote handset 100 sets a LINK_VERIFY_NORM_SUCCESS flag. The controller 105 then returns the remote handset 100 back to its sniff mode.

If, from step 250, the requested security word does not match, the link is deemed to be not verified, as shown in step 270. In this case, the controller 105 of the remote handset 100 sets a LINK_VERIFY_NORM_FAIL flag. The controller 105 then sends a "link verify fail message" to the base unit 150 and returns the remote handset 100 back to its sniff mode.

The controller 105 of the remote handset 100 may set the LINK_VERIFY_NORM_FAIL flag if the base unit 150 fails to send the requested security word or acknowledges the remote handset 100 request for the security word after a predetermined time-out period.

One aspect of the present invention is the correction of a local oscillator 130 to achieve frequency alignment without the use of a specific circuit. Instead, the frequency correction of the local oscillator 130 is accomplished using a software module implemented by the controller 105.

FIG. 3 is a more detailed flow diagram of the frequency alignment phase 250 of the real time slow drift correction of the alignment of the local oscillator 130 of the remote handset 100 shown in FIG. 2, in accordance with the principles of the present invention.

Within the frequency alignment phase, step 250, there is an exchange of commands that allows the local oscillator 130 of the remote handset 100 to frequency align. In typical digital cordless telephones, the commands that are exchanged are predetermined fixed size frames.

Once the controller 105 of the remote handset 100 is in the frequency alignment phase 250, the controller 105 enters into a timing recovery state, as shown in step 300, upon receiving a command from the base unit 150.

Upon receipt of the command, the controller 105 of the remote handset 100 reads the current timing state of the received frame, as shown in step 310.

In step 320, the current timing state of the received frame is compared with a previous timing state.

In step 330, if the timing difference or slip between the timing states is greater than a predetermined threshold, the controller 105 of the remote handset 100 adjusts the local oscillator 130, as shown in step 340. Alternatively, a series of comparisons may be implemented to tally a cumulative timing slip to be compared against the predetermined threshold.

Otherwise, the controller 105 of the remote handset 100 does not adjust the local oscillator 130, as shown in step 350. Subsequently, returning to FIG. 2, the controller 105 finishes the frequency alignment phase 250, and proceeds to step 260 or step 270.

Figure 4A:
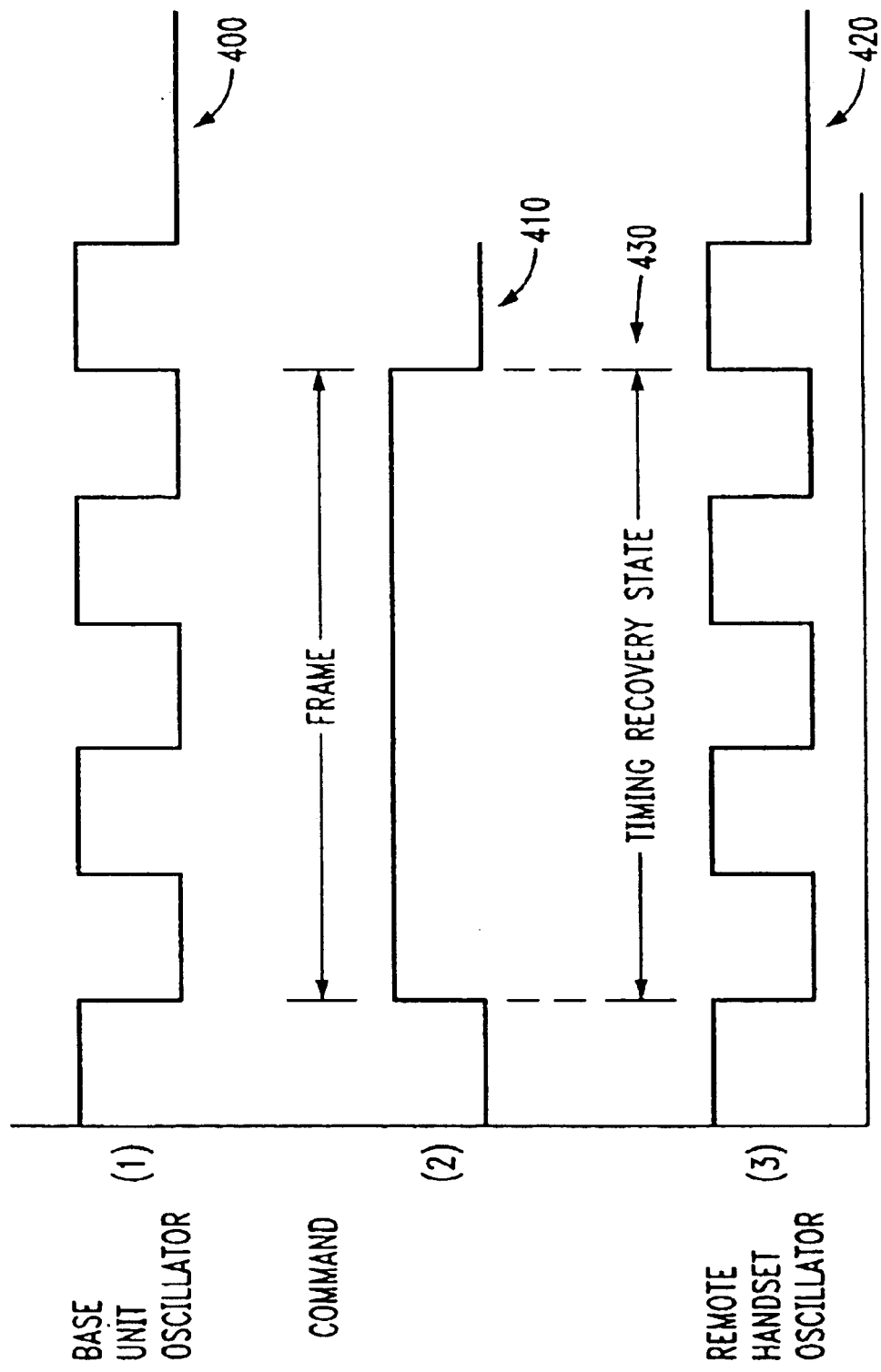
FIG. 4A illustrates a timing diagram of a timing recovery state for a frequency aligned remote handset oscillator.

FIG. 4A better illustrates the timing recovery state 300 of FIG. 3 in a timing diagram showing a base unit oscillator, a data frame, and a remote handset oscillator during a previous read operation.

In particular, a base unit oscillator output is represented by a base unit clock signal 400 as shown in waveform (1).

A data frame 410 represents a command as shown in waveform (2). The command is a fixed predetermined size.

A remote handset oscillator is represented by a remote handset clock signal 420 as shown in waveform (3).

When the base unit 150 transmits a command to the remote handset 100, the command (waveform (2)) is transmitted frequency aligned with the base unit clock signal 400 as shown in waveform (1).

When the remote handset 100 receives the command, the remote handset 100 enters into the timing recovery state 430 as shown in waveform (3). In the timing recovery state 430, the remote handset 100 is able to determine the timing of the command based on the remote handset clock signal 420 as shown in waveform (3).

The controller 105 of the remote handset 100 may determine timing using various techniques. For example, the controller 105 may count the zero crossings in the data frame 410 or monitor a sub-symbol clock counter at the end of the data frame 410. Since the timing recovery state 430 is a fixed amount of time, the timing of the data frame 410 may be easily derived.

Subsequently, the value of the timing of the command is retained to be compared against the next incoming command.

FIG. 4B illustrates a timing diagram of a base unit oscillator (waveform (1)), a data frame (waveform (2)), and a remote unit oscillator (waveform (3)) of a next incoming command when the remote unit oscillator 130 has drifted from the base unit oscillator 175.

As illustrated in FIG. 4B, the base unit oscillator is represented by the base unit clock signal 440 as shown in waveform (1). The command is represented as a data frame 450 as shown in waveform (2). The remote handset oscillator is represented by the remote unit clock signal 460 as shown in waveform (3).

As with FIG. 4A, a command is shown in waveform (3) as having been transmitted by the base unit 150 as a next frame 450 based on the base unit clock signal 440 as shown in waveform (1). However, in this event, the remote handset clock signal 460, shown in waveform (3) has drifted by the slip amount 480.

When the controller 105 of the remote handset 100 enters a timing recovery state 470, shown in waveform (3), the controller 105 determines the timing of the next frame 450. Since the remote handset clock signal 460 has drifted, the timing value of the next frame 450 differs by the value of the slip 480.

If the difference between the two commands is greater than some predetermined threshold, the local oscillator 130 of remote handset 100 may be adjusted. Alternatively, the differences between several received frames may be totaled and compared against a threshold to determine from an average or accumulated value whether or not the local oscillator 130 of the remote handset 100 needs to be adjusted.

Figure 5:
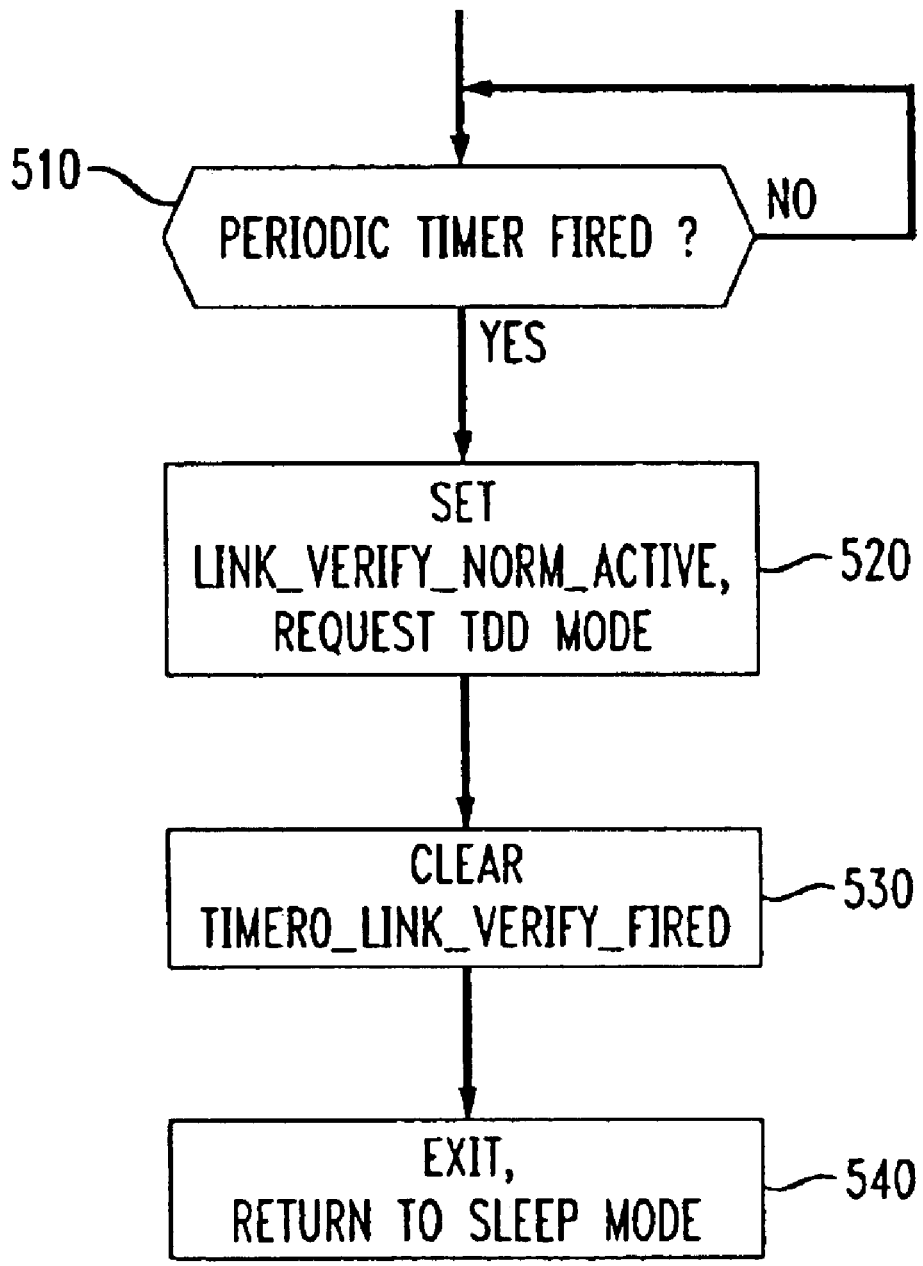
FIG. 5 shows an exemplary flow diagram of a remote handset standby function.

FIG. 5 illustrates a high level flow diagram of a normal link verification phase 220 (FIG. 2) used to implement the real-time slow drift correction in the remote handset of FIG. 1A.

In step 510, while the remote handset 100 is in sniff mode, the controller 105 of the remote handset 100 determines whether or not the link verify period setting timer 972 has elapsed. The link verify period setting timer 972 may be conveniently set to once every minute, hour, etc.

If the link verify period setting timer 972 has not elapsed, the controller 105 of the remote handset 100 returns to the beginning. Otherwise, the controller 105 sets the flag, LINK_VERIFY_NORM_ACTIVE, as shown in step 520. Then, the controller 105 requests to enter a time division duplexing (TDD) mode.

After the controller 105 of the remote handset 100 returns from the TDD mode, the controller 105 clears the flag, e.g., TIMER0_LINK_VERIFY_FIRED, as shown in step 530.

Subsequently, the controller 105 exits the normal link verification phase 220 and the controller 105 returns to its sniff mode, as shown in step 540.

Figure 6:
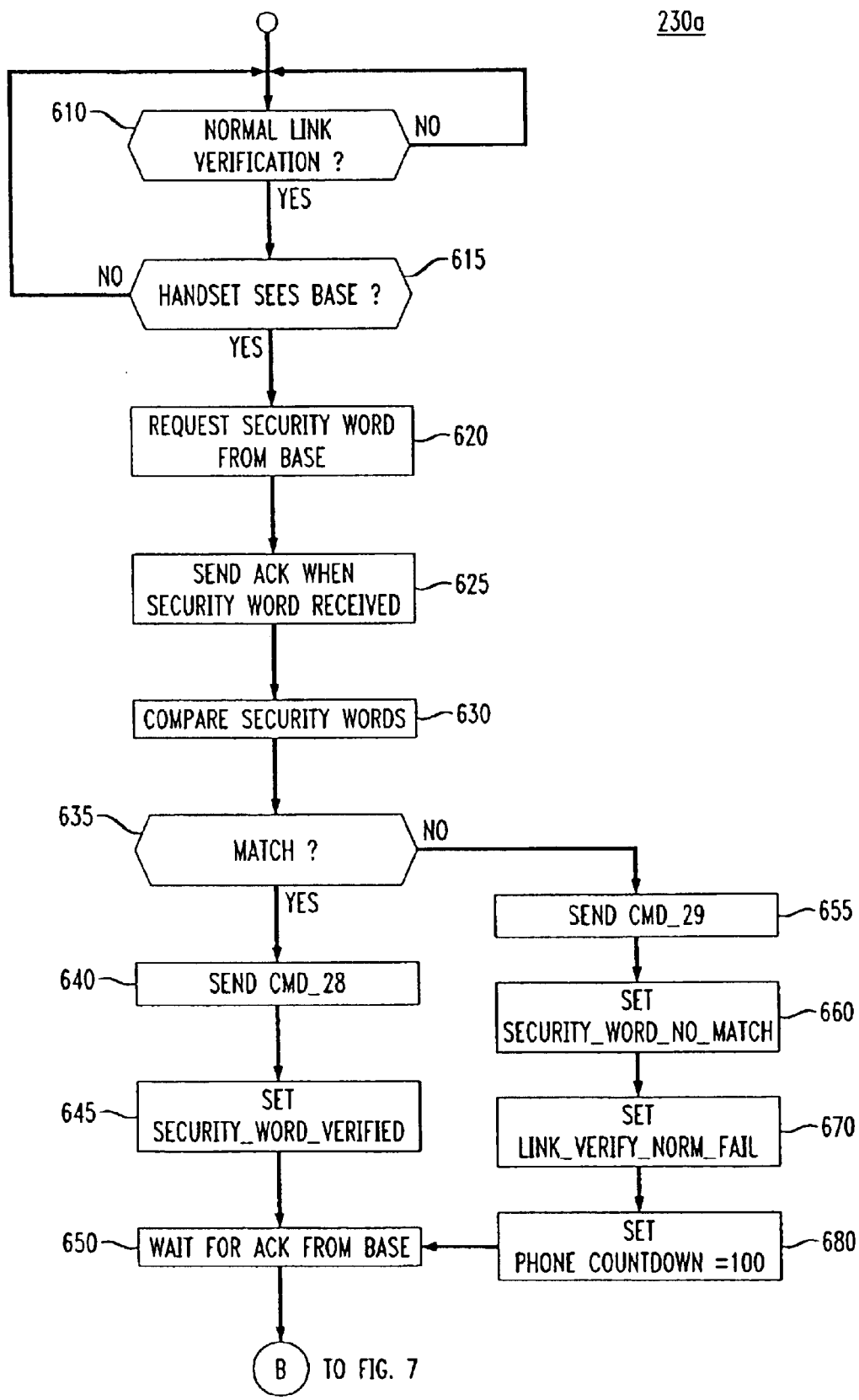
FIG. 6 shows an exemplary flow diagram of an initial part of a TDD mode of a remote handset.

FIG. 6 illustrates an exemplary flow diagram of the initial part of the TDD mode 230 shown in FIG. 2.

In particular, after the controller 105 of the remote handset 100 enters the TDD mode 230, the controller 105 checks to see if the LINK_VERIFY_NORM_ACTIVE flag has been set, as shown in step 610. If the LINK_VERIFY_NORM_ACTIVE flag has not been set, the controller 105 exits out of the TDD mode 230. Otherwise, the controller 105 moves to step 615.

In step 615, the controller 105 of the remote handset 100 is placed into an acquire state in order for the remote handset 100 to acquire the base unit 150. The controller 155 in the base unit 150, also in sniff mode, wakes up to respond to the remote handset 100. Otherwise, if the controller 105 of the remote handset 100 is not placed into the acquire state, the controller 105 exits the TDD mode 230.

Once the remote handset 100 sees the base unit 150, the controller 105 of the remote handset 100 requests a security word from the base unit 150 by sending a suitable command, e.g., command CMD_2F, as shown in step 620.

In response to the received security word from the base unit 150, the controller 105 of the remote handset 100 sends an acknowledgment ACK to the base unit 150, as shown in step 625. In this embodiment, the RF command exchange is 8 bits, but the RF command may be any designated length. Since, in this embodiment, the RF command exchange is 8 bits, the base unit 150 would first send the lower byte followed by the upper byte of the security word in response to receiving the CMD_2F, or other designated command from the remote handset 100. The base unit 150 sends the upper byte of the security word in response to an ACK from the remote handset 100 receiving the lower byte.

In step 630, after the upper byte of the security word is received by the remote handset 100, the controller 105 compares the transmitted security word with the security word stored in the EEPROM 135, and a match is determined in step 635.

In step 640, if there is a match in the security word, the controller 105 of the remote handset 100 transmits a link verify command (e.g., CMD_28) or other designated command, to the base unit 150. The CMD_28, or other designated command, represents that the link has been verified.

A flag, e.g., SECURITY_WORD_VERIFIED, is set in a security state called SECURITY_VERIFIED_STATE, as shown in step 645.

In step 650, the controller 105 of the remote handset 100 waits for another ACK from the base unit 150 based on a set timer. The controller 105 will exit out of the TDD mode 230 if the base unit 150 fails to respond before the expiration of the timer.

Returning to step 635, if there is not a match, the controller 105 of the remote handset 100 transmits a CMD_29, or other designated command, to the base unit 150, as shown in step 655. The CMD_29, or other designated command, represents that the link has not been verified.

In step 660, the controller 105 sets a flag, e.g., SECURITY_WORD_NO_MATCH, while the controller 105 is in a security state, e.g., SECURITY_VERIFY_STATE.

In step 670, the controller 105 of the remote handset 100 sets a flag, e.g., LINK_VERIFY_NORM_FAIL.

Subsequently, as shown in step 680, a timer, e.g., phone_countdown, is initialized by the controller 105 of the remote handset 100 to a value of, e.g., 100, preferably corresponding to the number of RF frames. The timer in this embodiment is set to expire after approximately 500 msec.

The controller 105 of the remote handset 100 then returns to step 650 for further processing.

Figure 7:
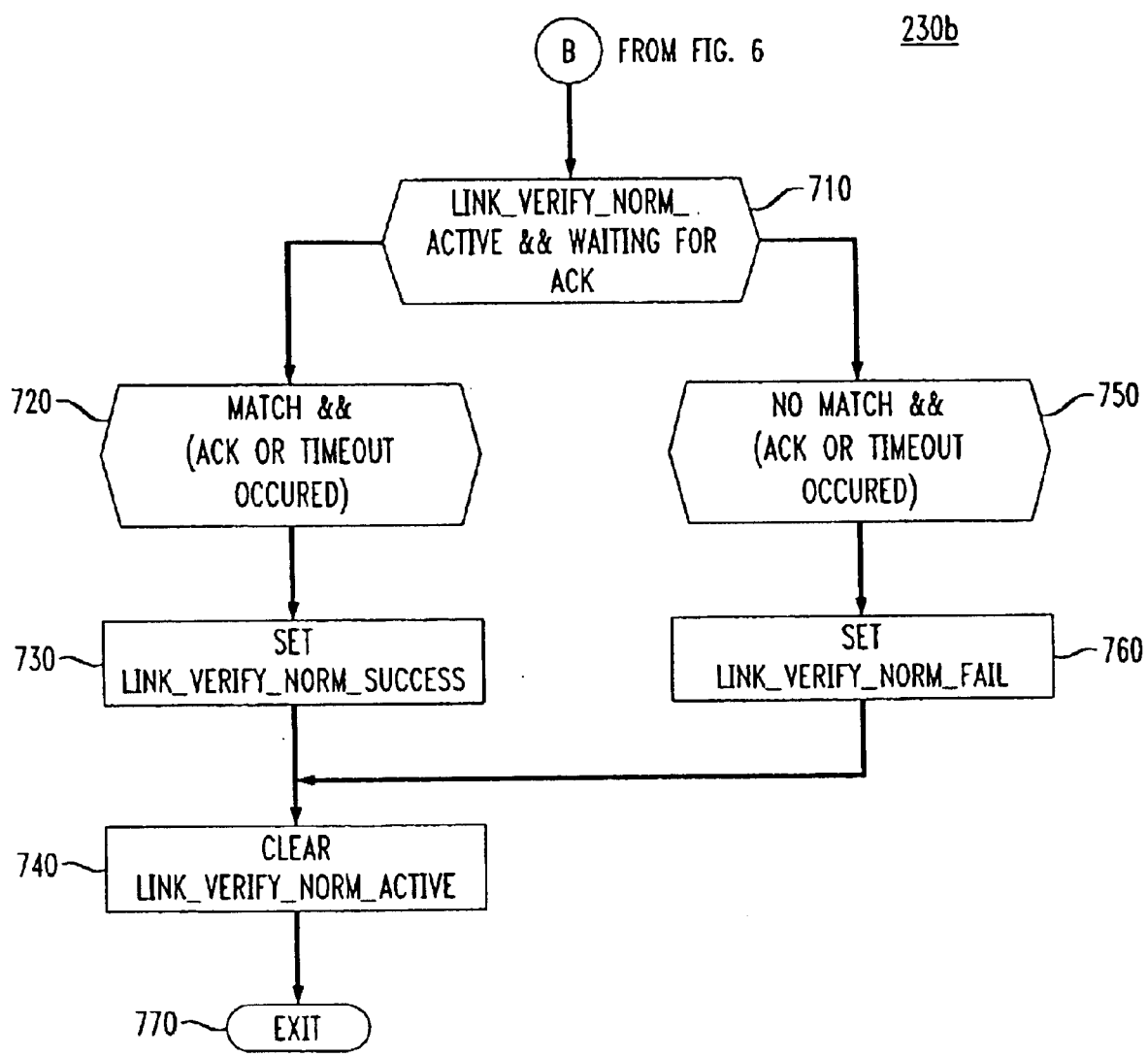
FIG. 7 shows a flow diagram of the concluding part of the TDD mode illustrated in FIG. 6.

FIG. 7 represents an exemplary flow diagram of the latter part of the TDD mode 230 in FIG. 2.

After step 650 of FIG. 6, the controller 105 of the remote handset 100 determines if the LINK_VERIFY_ACTIVE flag has been set and the controller 105 is waiting for an ACK from the base unit 150 from the match/no-match determination of the security word, as shown in step 710 of FIG. 7.

If the two conditions are met, the controller 105 of the remote handset 100 then determines whether or not there was a match, and whether or not the ACK has been received or a time-out has occurred, as shown in step 720.

If there was a match and the ACK has been received or a time-out has occurred, the controller 105 sets a LINK_VERIFY_NORM_SUCCESS flag, as shown in step 730.

In step 740, the controller 105 of the remote handset 100 clears the LINK_VERIFY_NORM_ACTIVE flag and subsequently exits the TDD mode 230, as shown in step 770.

Returning to step 710, if the two conditions are met, the controller 105 of the remote handset 100 determines whether or not there has been a no-match determination and an ACK has not been received, or a time-out has occurred, as shown in step 750.

If there has been a no-match, no ACK, or the time-out determination from step 750, the controller 105 then sets a LINK_VERIFY_NORM_FAIL flag, as shown in step 760. The controller 105 of the remote handset 100 then returns to step 740.

The objective of this periodic link verification is to allow the remote handset to run for a time sufficiently long enough to track the slow drift of its local oscillator with respect to the base unit since the last correction was made. The last correction may have occurred during either a link verification or a normal traffic link. If the handset does not establish a link with the base unit within the time-out period (e.g., 400 or 800 msec), then the handset flags that condition as a link verification fail, LINK_VERIFY_NORM_FAIL. If the system fails to start up within 400 msec of establishing the link, that is also considered a link verification fail. Upon failure, coarse frequency alignment can be performed.

Thus, in accordance with the principles of the present invention, measure of a timing slip between frames of a time division communication from the base unit to the remote handset of a cordless telephone (or other wireless device) is used as a basis for correcting the frequency of a local oscillator in the remote handset to be aligned with the timing of the matching unit, i.e., the base unit. Moreover, in the disclosed embodiment, the frequency alignment was performed on a periodic basis, e.g., every minute, utilizing the communications during a sniff mode as the data frame for comparison to a previously measuring timing to determine if an excessive amount of slip has occurred.

In accordance with another aspect of the present invention the timed instantiation of the frequency alignment procedure can be adjusted to conserve power of the remote handset 100, particularly when the remote handset 100 is being charged by the base unit 150. This will enable the reduction of the overall power requirements of the cordless telephone, particularly when power consumption is at its highest during a "quick charge" operation of the battery 971 in the remote handset 100. Reduction of the maximum power requirements of the cordless telephone enables the use of a smaller and less expensive AC to DC charger, lower heat buildup in the cordless telephone, and other benefits of a lower power device.

In particular, the period of the link verify operation in the earlier embodiments is preferably set to account for the worst case situation causing misalignment in the frequency between the remote handset 100 and the base unit 150, e.g., worst case changes in temperature and battery voltage in the remote handset 100. However, since the remote handset 100 is often kept in the same location as the base unit 150, temperature changes may not be a significant factor causing misalignment of the frequency. This is particularly true when the remote handset 100 is being charged by the base unit 150.

In such a case, the period between link verify operations can be lengthened without detrimentally affecting performance of the cordless telephone. For instance, when the remote handset 100 is detected as being cradled by the base unit 150 (e.g., when being charged), affects due to differences in temperature between the remote handset 100 and the base unit may effectively be ruled out. This leaves only a difference in voltage level as a significantly contributing factor to a drift of the local oscillator in the remote handset 100.

In accordance with this aspect of the present invention, the voltage level of the battery 971 in the remote handset 100 can be measured and used as a basis in determining a tolerance in how often frequency alignment should be performed between the remote handset 100 and the base unit 150.

Initially when a remote handset 100 is cradled, and/or at all times when the remote handset 100 is not cradled (and therefore remote from the base unit 150), the link verify period can be set to accommodate the worst case scenario for frequency misalignment. Thus, the link verify period can be set to its most frequent setting. Then, as the voltage level of the battery 971 in the remote handset 100 increases under a "quick charge" or similar operation (indicating a more fully charged battery) the period between link verify operations can be lengthened. Lengthening of the link verify operations will not detrimentally affect frequency alignment as the voltage level of the battery 971 increases because the commensurate affects on the local oscillator 130 will likewise improve.

Thus, in the disclosed embodiment, when the remote handset 100 is being charged (particularly at a "quick charge" high current level), the link verify period would not be set to a fixed time period but would instead be based on a voltage level of the battery 971.

The desired minimum interval between link verify operations (and thus TDD based frequency alignment operations) can be determined empirically based on, e.g., laboratory measurements, and set by the factory in the cordless telephone. Alternatively, the desired intervals between frequency alignment operations can be based on historical operation of a particular cordless telephone and automatically adjusted by the controller 105 on an on-going basis. As the link verify period increases, power consumption by the cordless telephone will be reduced.

In accordance with the principles of this aspect of the present invention, it is preferred that a minimum link verify period also be established to ensure that frequency alignment occasionally takes place even with a fully charged battery 971 in the remote handset 100.

A specific example is provided showing a design combining both voltage-based and scheduled interval-based link verify periods.

In particular, a link verify period can be set to be a most frequent setting level, e.g., once every 10 minutes, when the battery 971 is deemed to be fully charged (i.e., at its maximum voltage level). When the battery 971 is fully charged, the battery 971 draws minimal if any power, and thus the overall power budget can easily accommodate a more frequent link verify operation allowing more frequent frequency alignment operations.

However, if the voltage level of the battery 971 is fully discharged, the full capability of the AC to DC power converter may be required, and power usage in the cordless telephone may be at its greatest. Thus, to help conserve use of power when conservation is most important, the link verify period can be set to its least frequent level, e.g., once every hour.

Then, as the battery 971 becomes charged and the power draw is reduced, more frequent link verify periods can be accommodated within the power budget.

Figure 8:
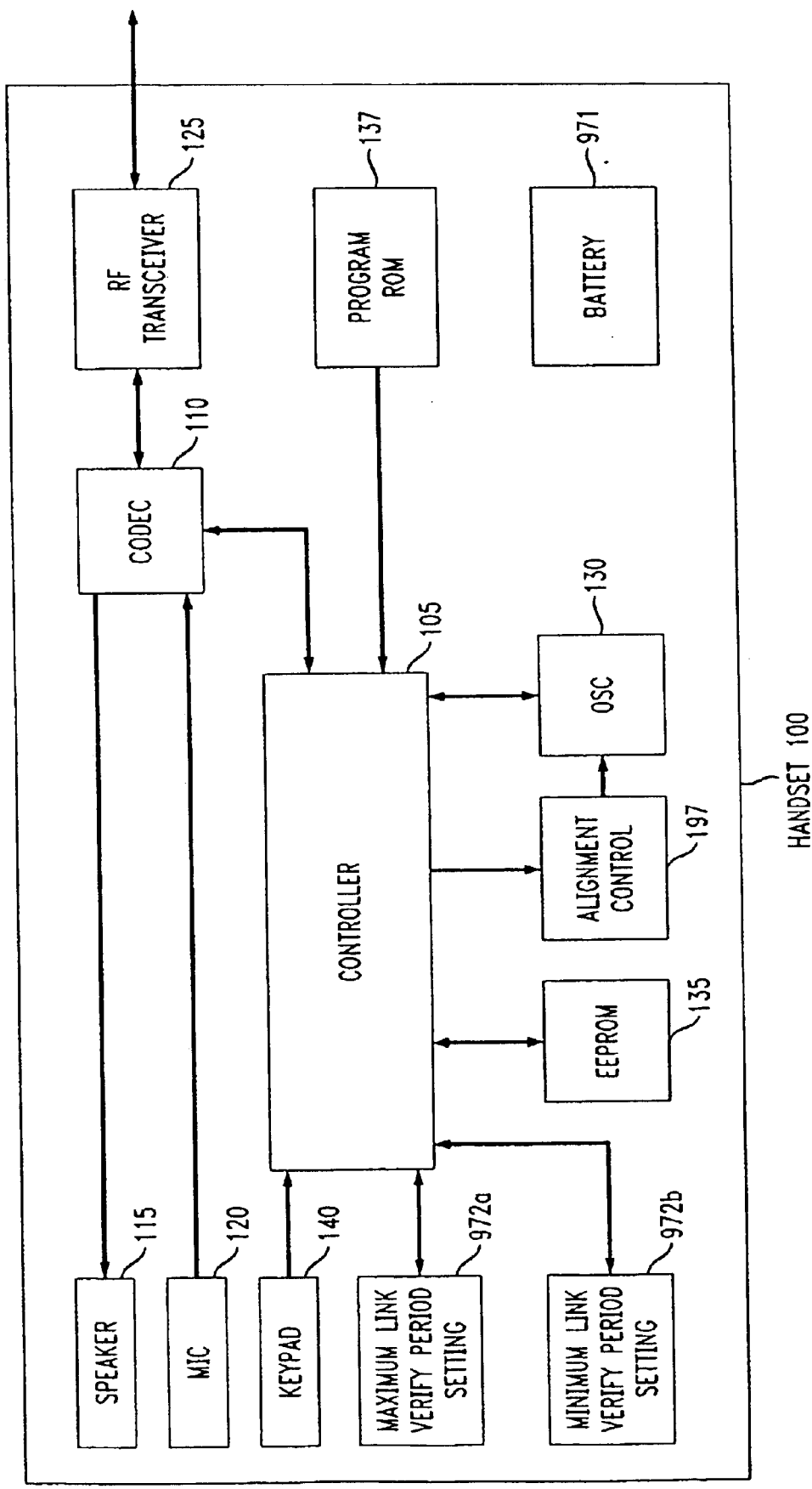
FIG. 8 shows the extension of the embodiment of FIG. 1 to include a maximum link verify period setting (i.e., least frequent) and a minimum link verify period setting (i.e., most frequent).

FIG. 8 shows the extension of the embodiment of FIG. 1 to include a maximum link verify period setting 972a (i.e., least frequent) and a minimum link verify period setting 972b (i.e., most frequent).

In particular, rather than a fixed link verify period setting 972 as shown in FIG. 1, a maximum and minimum value for the link verify period may be established, with the minimum link verify period setting 972b serving as the "default" link verify period when, e.g., the remote handset 100 is remote from the base unit 150.

Figure 9:
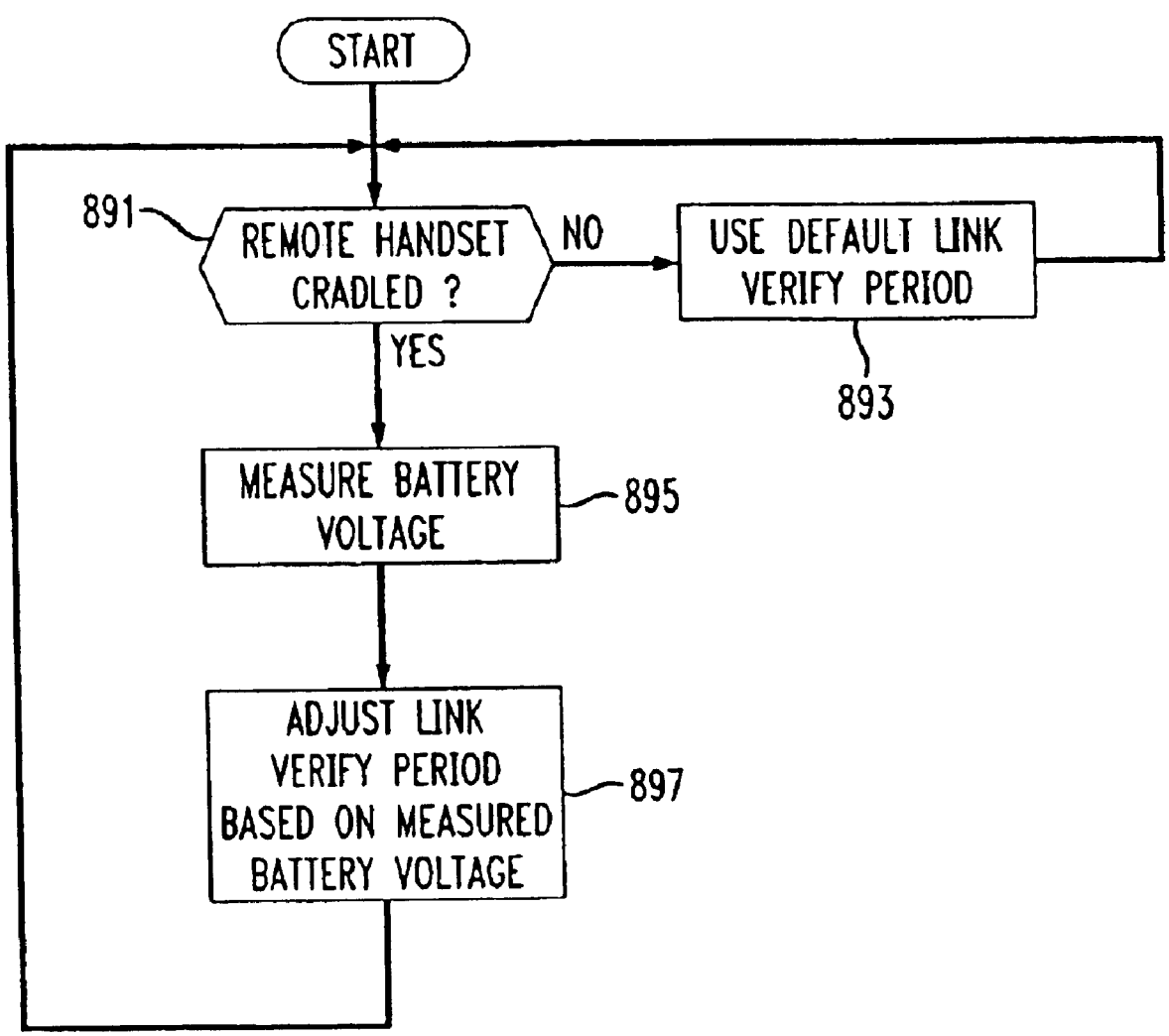
FIG. 9 is a flow chart showing an exemplary adjustment of the link verify period using a fixed period when the remote handset is remote from the base unit and using an adjustable period based on the voltage of the battery when the remote handset is cradled in the base unit, in accordance with another aspect of the present invention.

FIG. 9 is a flow chart showing an exemplary adjustment of the link verify period using a fixed period when the remote handset 100 is remote from the base unit 150 and using an adjustable period based on the voltage of the battery 971 when the remote handset 100 is cradled in the base unit 150.

In particular, in step 891 of FIG. 9, the remote handset 100 determines if it is cradled and receiving a charge to its battery 971. Alternatively, the base unit 150 can determine if the remote handset 100 is cradled and receiving a charge and communicate that information to the remote handset 100 over the wireless communications between the two.

In step 893, if the remote handset 100 is not cradled, a default link verify period (e.g., the most frequent period accommodating the worst case scenario) is used.

However, if the remote handset 100 is cradled, the voltage of the battery 971 in the remote handset 100 is measured, as shown in step 895.

In step 897, the period of the link verify operations (and thus of the frequency alignment operations) is adjusted based on the current voltage of the battery 971 measured in step 895.

It is also within the principles of the present invention to extend or even suspend the link verification process (and thus frequency alignment) altogether at desired times, e.g., when the remote handset 100 is in a quick charge mode, since during this mode the cordless telephone is likely at or near its maximum power draw. Thereafter, when the quick charge level is turned off and, e.g., a trickle charge current level is being provided to the battery 971, the adjustable link verification period can again be set to be based on a voltage level of the battery 971.

Figure 10:
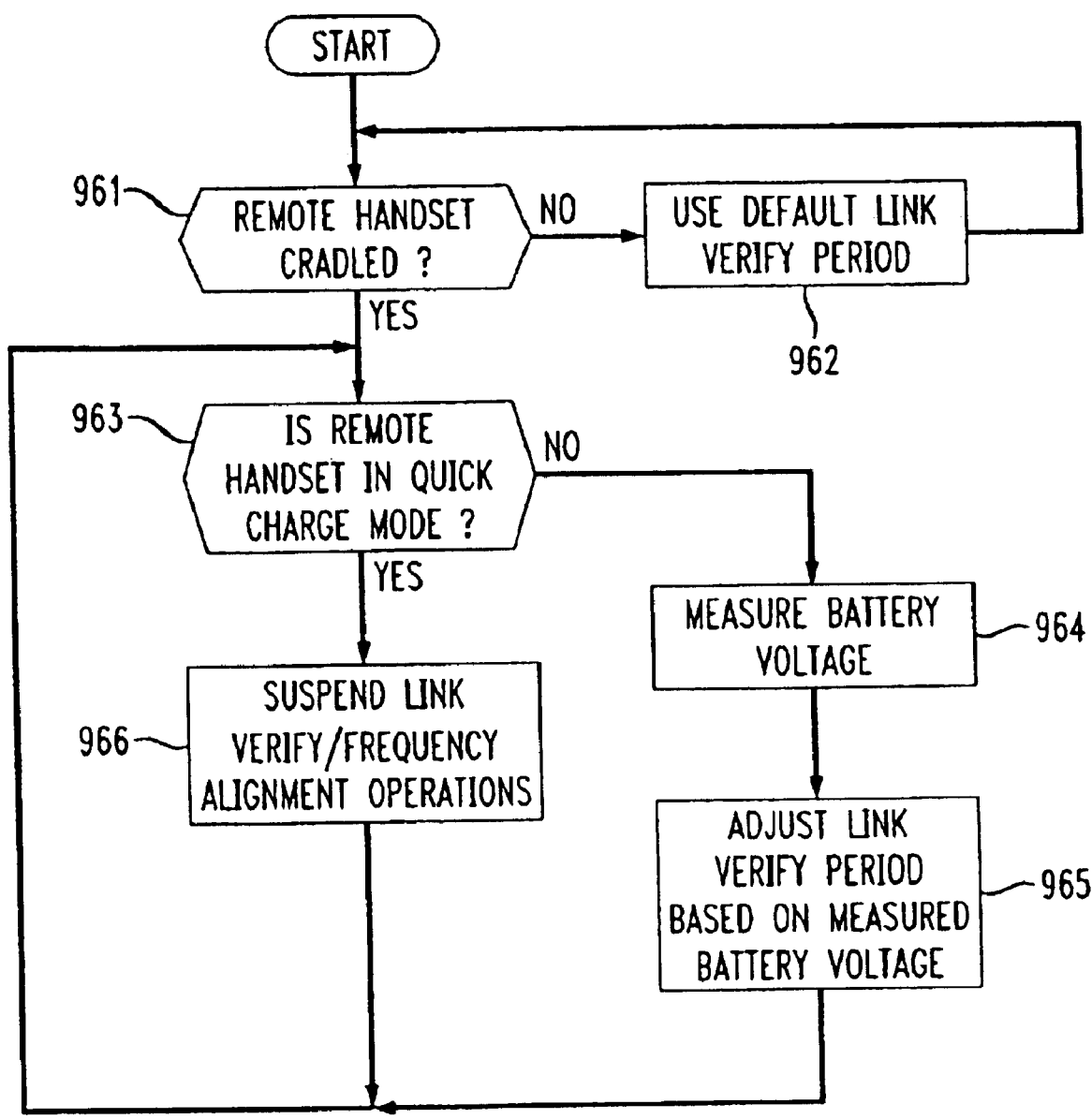
FIG. 10 is a flow chart showing an exemplary adjustment of the link verify period using a fixed period when the remote handset is remote from the base unit, suspending the link verification operations (and thus frequency alignment operations) when the remote handset is in a quick charge mode, and using an adjustable period based on the voltage of the battery when the remote handset is cradled in the base unit, e.g., when receiving a trickle charge or no charge, in accordance with yet another aspect of the present invention.
Figure 11A:
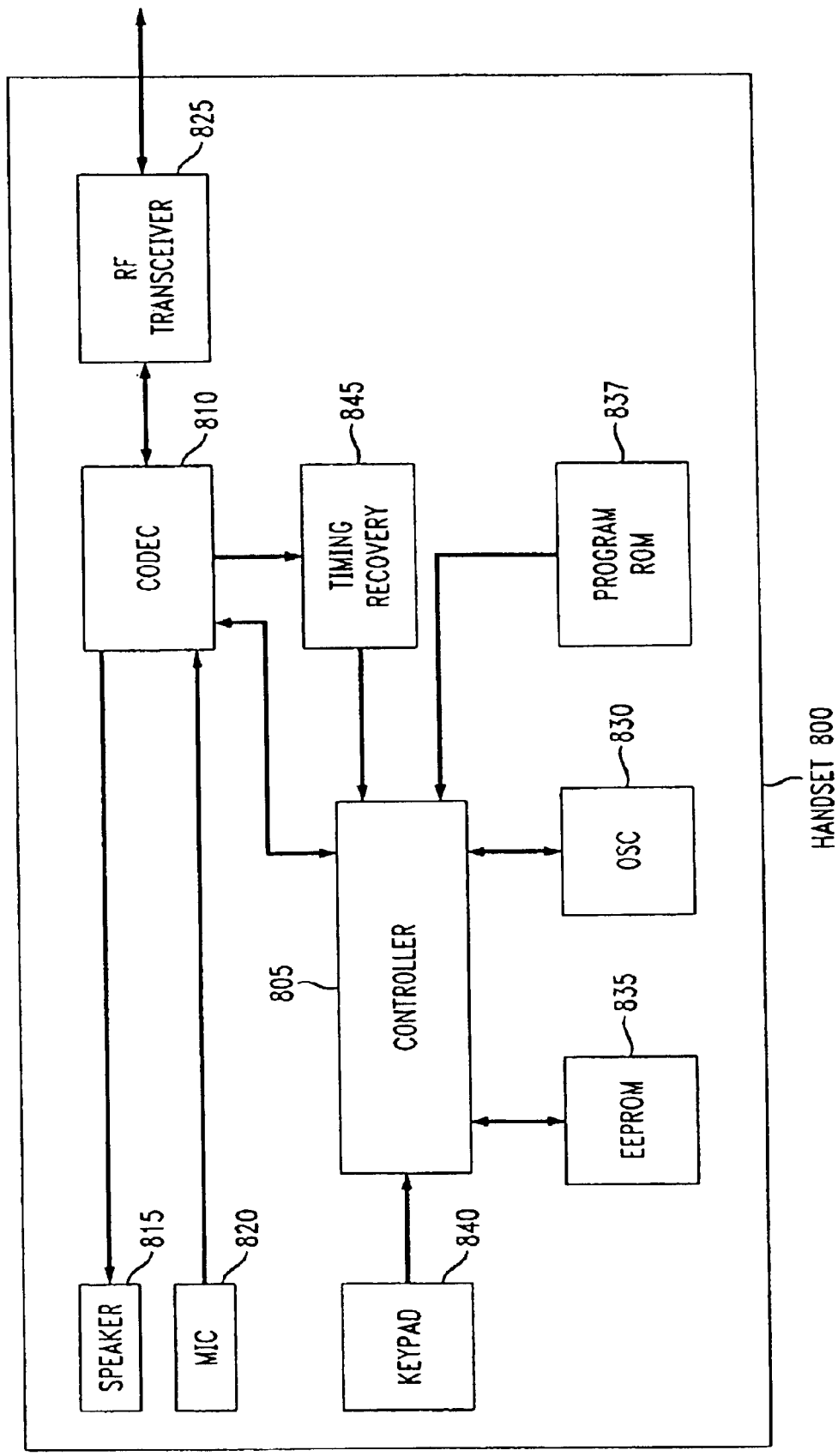
FIG. 11A shows a block diagram of a conventional remote handset of a digital cordless telephone.
Figure 11B:
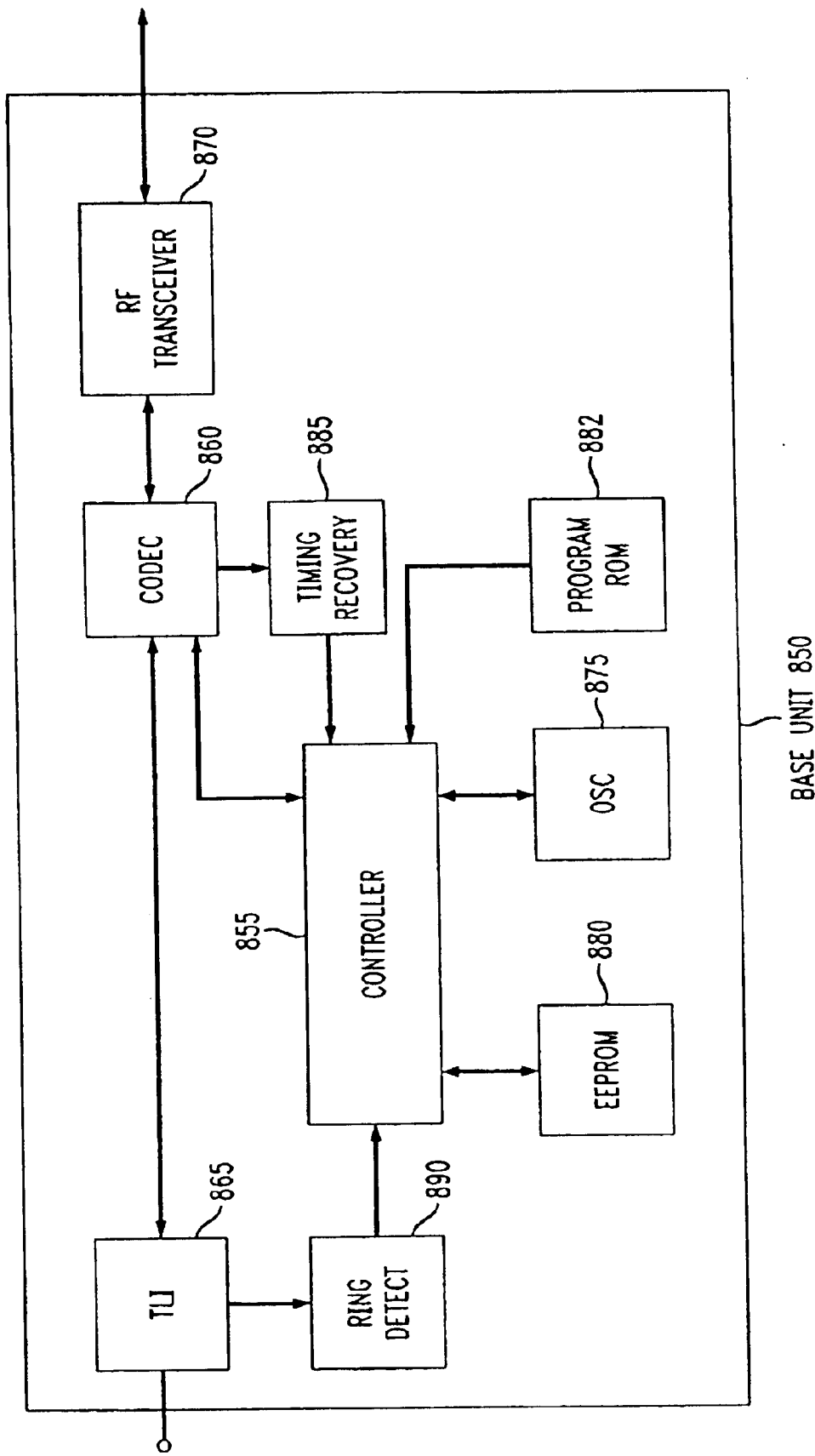
FIG. 11B shows a block diagram of a conventional base unit of a digital cordless telephone.
Figure 12:
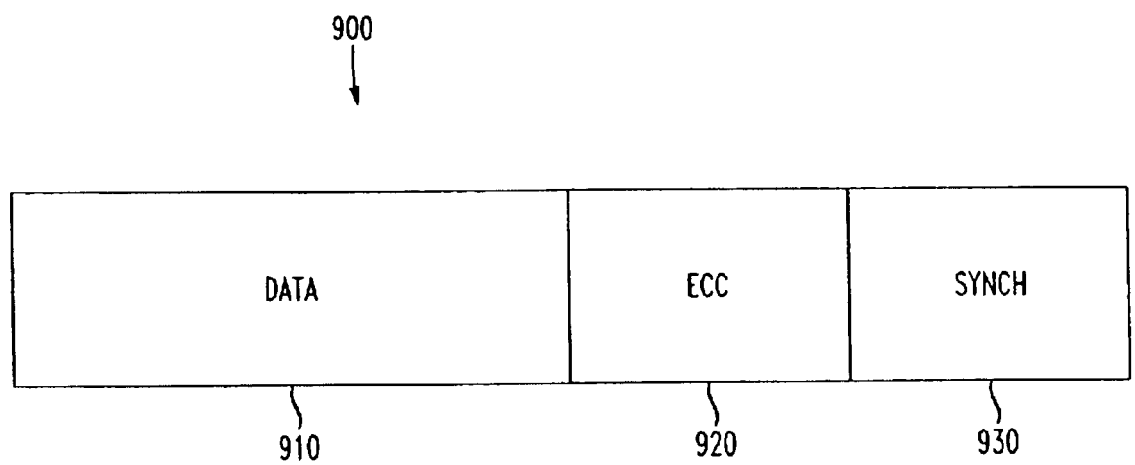
FIG. 12 shows a conventional frame with a synchronization field used in an RF link between a remote handset and a base unit of a digital cordless telephone.

For instance, FIG. 10 is a flow chart showing an exemplary adjustment of the link verify period using a fixed period when the remote handset 100 is remote from the base unit 150, suspending the link verification operations (and thus frequency alignment operations) when the remote handset 100 is in a quick charge mode, and using an adjustable period based on the voltage of the battery 971 when the remote handset 100 is cradled in the base unit 150, e.g., when receiving a trickle charge or no charge.

In particular, in step 961 of FIG. 10, either the remote handset 100 and/or the base unit 150 determines whether or not the remote handset 100 is cradled in the base unit 150.

In step 962, if the remote handset 100 is not cradled, the default link verify period is used.

However, if the remote handset 100 is cradled, a further determination is made as to whether or not the remote handset 100 is receiving the high current quick charge or not, as shown in step 963.

If the remote handset 100 is in a quick charge mode, then the link verify operations (and thus the frequency alignment operations) are suspended altogether in step 966. Once the battery 971 is charged sufficient for the remote handset 100 to exit the quick charge mode (e.g., to enter a trickle charge mode), the link verify operations can be re-enabled by re-determination of step 963.

If the remote handset 100 is not in a quick charge mode, then the voltage of the battery 971 is measured in step 964, and the link verify period is adjusted based on the measured battery voltage level, as shown in step 965.

While the invention has been described with reference to the exemplary embodiments thereof, those skilled in the art will be able to make various modifications to the described embodiments of the invention without departing from the true spirit and scope of the invention.

What is claimed is:

1. A method of determining a period for an operation between a remote unit and a matching base unit, said method comprising:

detecting a charging to a remote handset from a base unit; and adjusting a period between a check of frequency alignment between said remote handset and said base unit based on a battery voltage level in said remote handset.

2. The method of determining a period for an operation between a remote unit and a matching base unit according to claim 1, further comprising:

suspending said check of said frequency alignment when said remote handset is in a predetermined mode.

3. The method of determining a period for an operation between a remote unit and a matching base unit according to claim 2, wherein:

said predetermined mode is a quick charge mode.

4. The method of determining a period for an operation between a remote unit and a matching base unit according to claim 1, wherein:

said period is adjusted between a predetermined maximum period and a predetermined minimum period.

5. Apparatus for determining a period for an operation between a remote unit and a matching base unit, comprising:

means for detecting a charging to a remote handset from a base unit; and means for adjusting a period between a check of frequency alignment between said remote handset and said base unit based on a battery voltage level in said remote handset.

6. The apparatus for determining a period for an operation between a remote unit and a matching base unit according to claim 5, further comprising:

means for suspending said check of said frequency alignment when said remote handset is in a predetermined mode.

7. The apparatus for determining a period for an operation between a remote unit and a matching base unit according to claim 6, wherein:

said predetermined mode is a quick charge mode.

8. The apparatus for determining a period for an operation between a remote unit and a matching base unit according to claim 5, wherein:

said period is adjusted between a predetermined maximum period and a predetermined minimum period.

9. A method of adjusting a frequency of an alignment operation between two wireless components that communicate with one another, comprising:

monitoring a voltage output level of a battery in at least one of said two wireless components; and decreasing a frequency of said alignment operation between said two wireless components if said monitored voltage output level of said battery falls below a given threshold level.

10. The method of adjusting a frequency of an alignment operation between two wireless components that communicate with one another according to claim 9, wherein:

said two wireless components comprise a cordless telephone.

11. The method of adjusting a frequency of an alignment operation between two wireless components that communicate with one another according to claim 10, wherein:

said monitored battery powers a remote handset of said cordless telephone.

12. The method of adjusting a frequency of an alignment operation between two wireless components that communicate with one another according to claim 10, wherein:

said frequency of said alignment operation maintains at least 15 minutes between frequency alignment operations.

13. Apparatus for adjusting a frequency of an alignment operation between two wireless components that communicate with one another, comprising:

means for monitoring a voltage output level of a battery in at least one of said two wireless components; and means for decreasing a frequency of said alignment operation between said two wireless components if said monitored voltage output level of said battery falls below a given threshold level.

14. The apparatus for adjusting a frequency of an alignment operation between two wireless components that communicate with one another according to claim 13, wherein:

said two wireless components comprise a cordless telephone.

15. The apparatus for adjusting a frequency of an alignment operation between two wireless components that communicate with one another according to claim 14, wherein:

said monitored battery powers a remote handset of said cordless telephone.

16. The apparatus for adjusting a frequency of an alignment operation between two wireless components that communicate with one another according to claim 13, wherein:

said means for decreasing a frequency of said alignment operation adjusts said frequency of said alignment operations to maintain at least 15 minutes between frequency alignment operations.

* * * * *